United States Patent [19]

Van Blerk et al.

[11] 4,383,370

[45] May 17, 1983

[54] WHEEL ALIGNMENT SYSTEM AND METHOD

[75] Inventors: Victor B. Van Blerk, San Jose; Donald B. Curchod, Saratoga, both of Calif.

[73] Assignee: Nortron Corporation, Sunnyvale, Calif.

[21] Appl. No.: 51,804

[22] Filed: Jun. 25, 1979

[51] Int. Cl.³ .............................................. G01B 11/26
[52] U.S. Cl. .................................... 33/203.18; 33/336
[58] Field of Search ................ 33/203, 203.18, 203.15, 33/203.2, 288, 336, 337, 228

[56] References Cited

U.S. PATENT DOCUMENTS

| | | | |
|---|---|---|---|
| 3,164,910 | 1/1965 | Manlove | 33/203.18 |
| 3,337,961 | 8/1967 | Holub | 33/203.18 X |
| 3,855,709 | 12/1974 | Hirmann | 33/203.15 |
| 4,097,157 | 6/1978 | Lill | 33/288 |
| 4,106,208 | 8/1978 | Hunter | 33/288 |
| 4,126,943 | 11/1978 | Senften | 33/203.18 |
| 4,159,574 | 7/1979 | Samuelsson et al. | 33/203.18 |

Primary Examiner—William D. Martin, Jr.
Attorney, Agent, or Firm—Allegretti, Newitt, Witcoff & McAndrews

[57] ABSTRACT

A wheel alignment system and method for determining the thrust line of a vehicle and employing the thrust line when positioning the steerable wheels of the vehicle to a plane parallel to the thrust line as well as during the determination of set-back between laterally spaced wheels.

12 Claims, 13 Drawing Figures

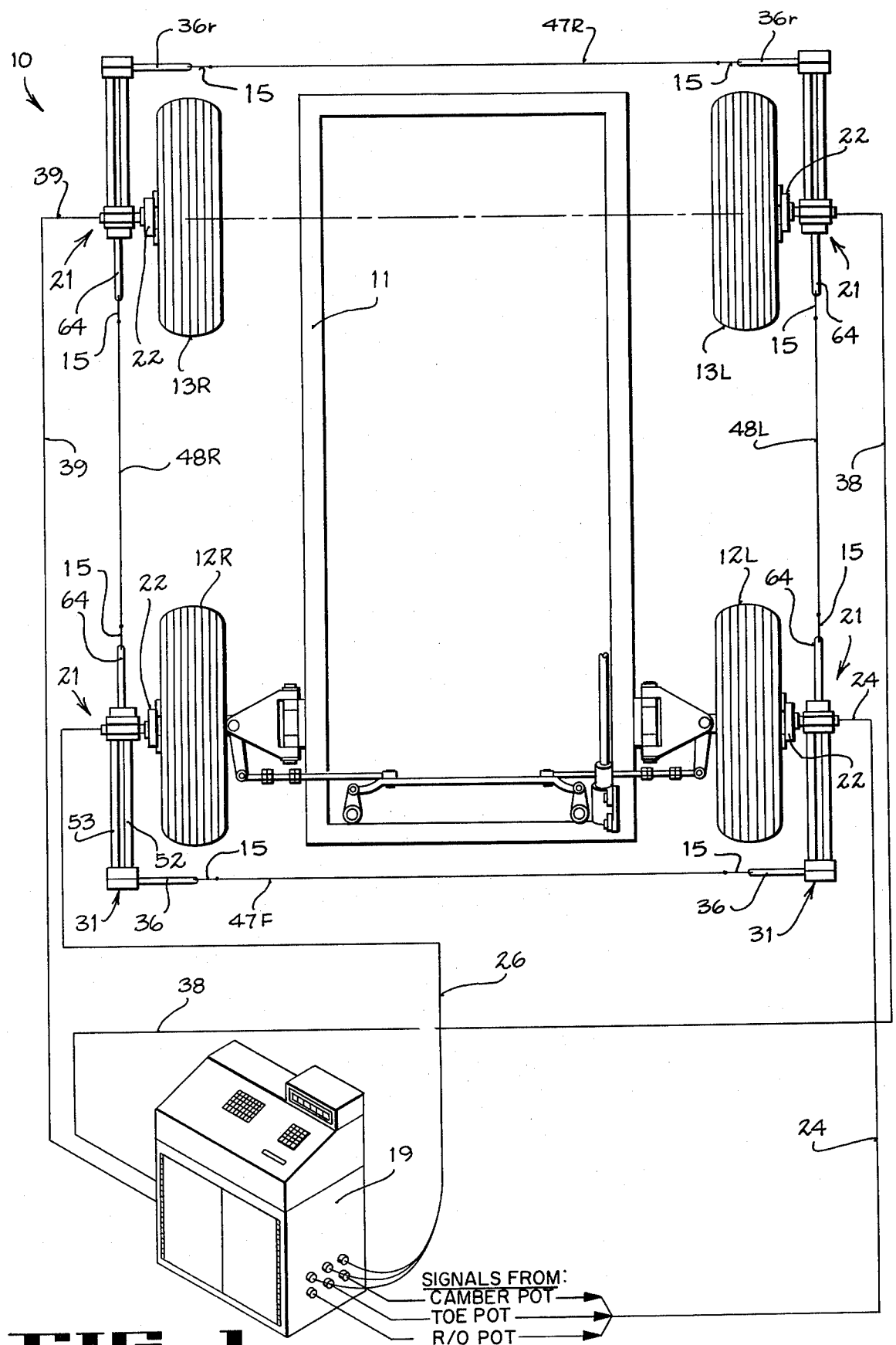

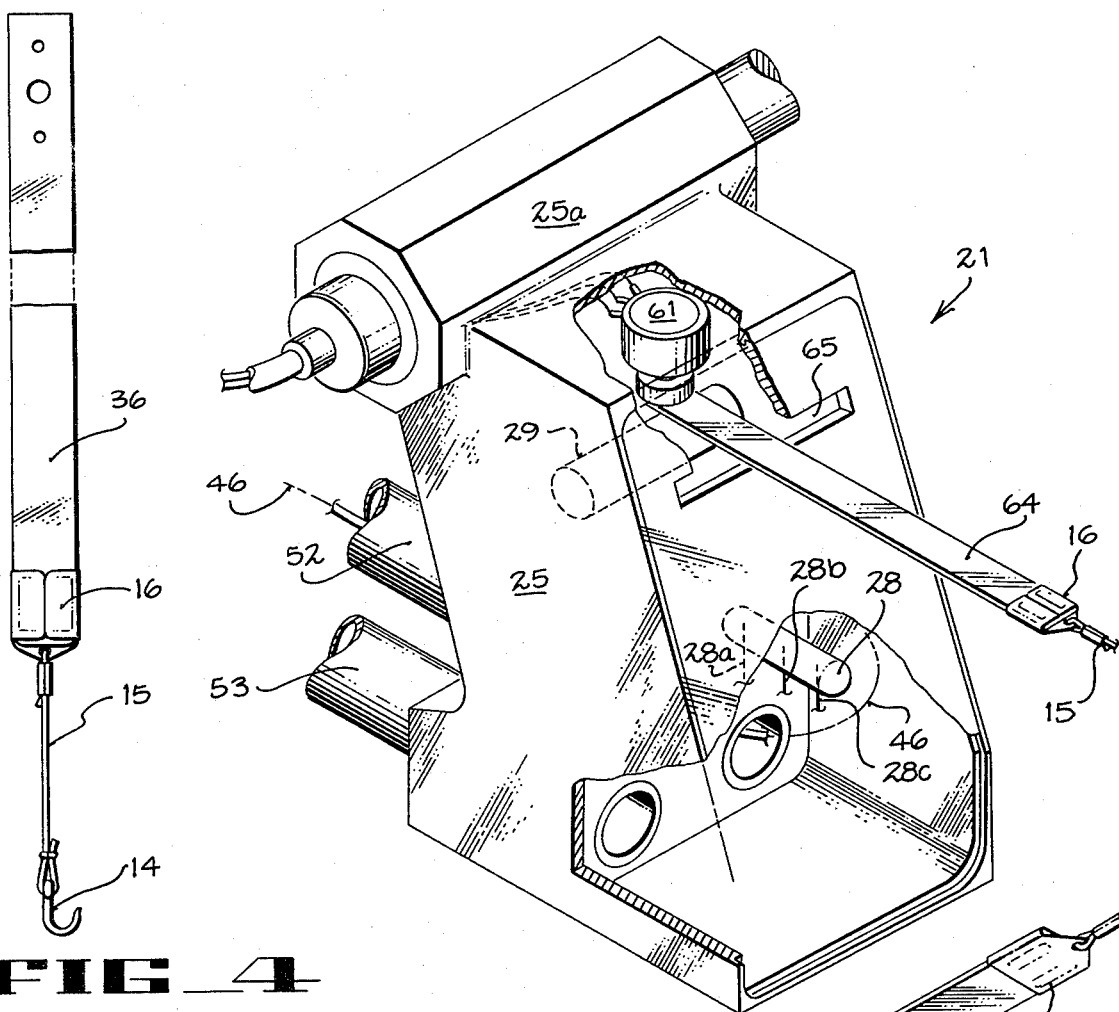
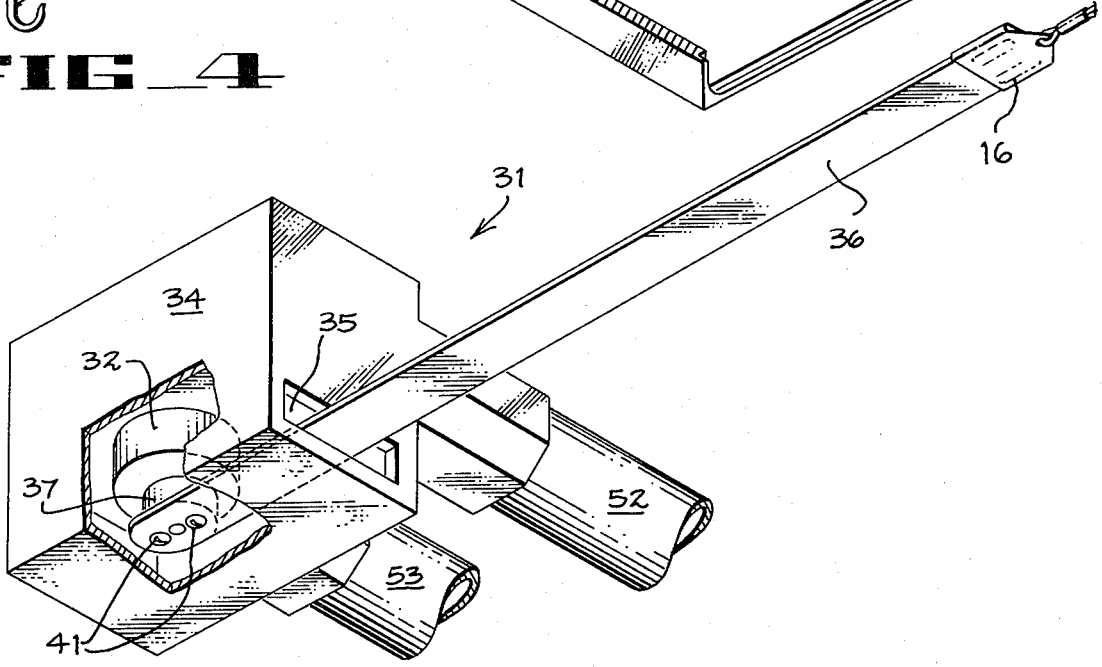

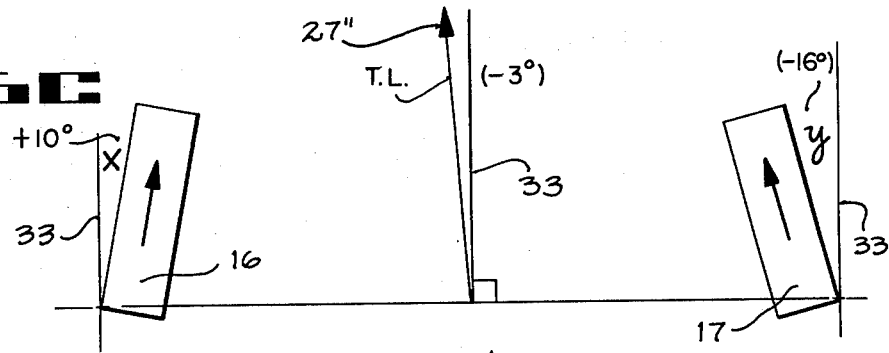
FIG_5C
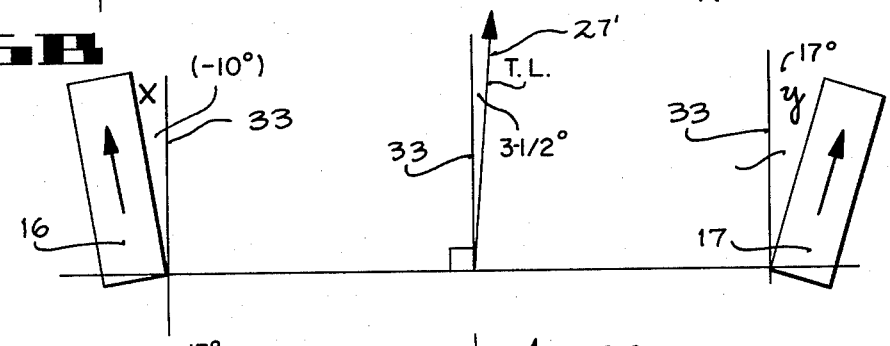
FIG_5B
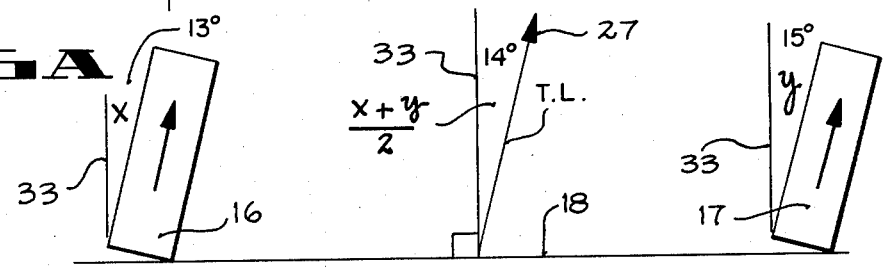
FIG_5A
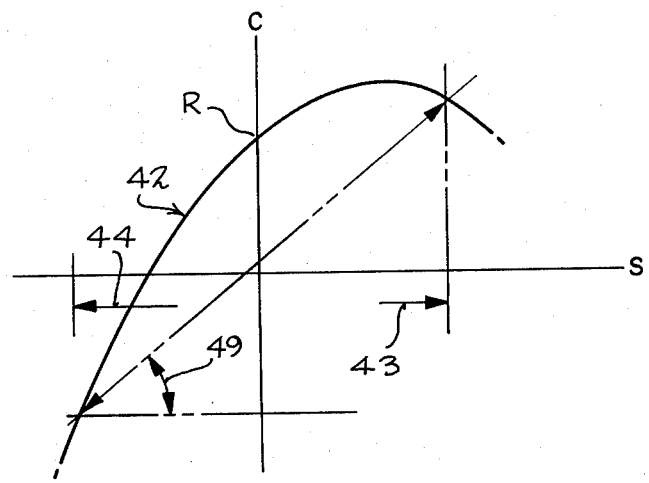
FIG_8

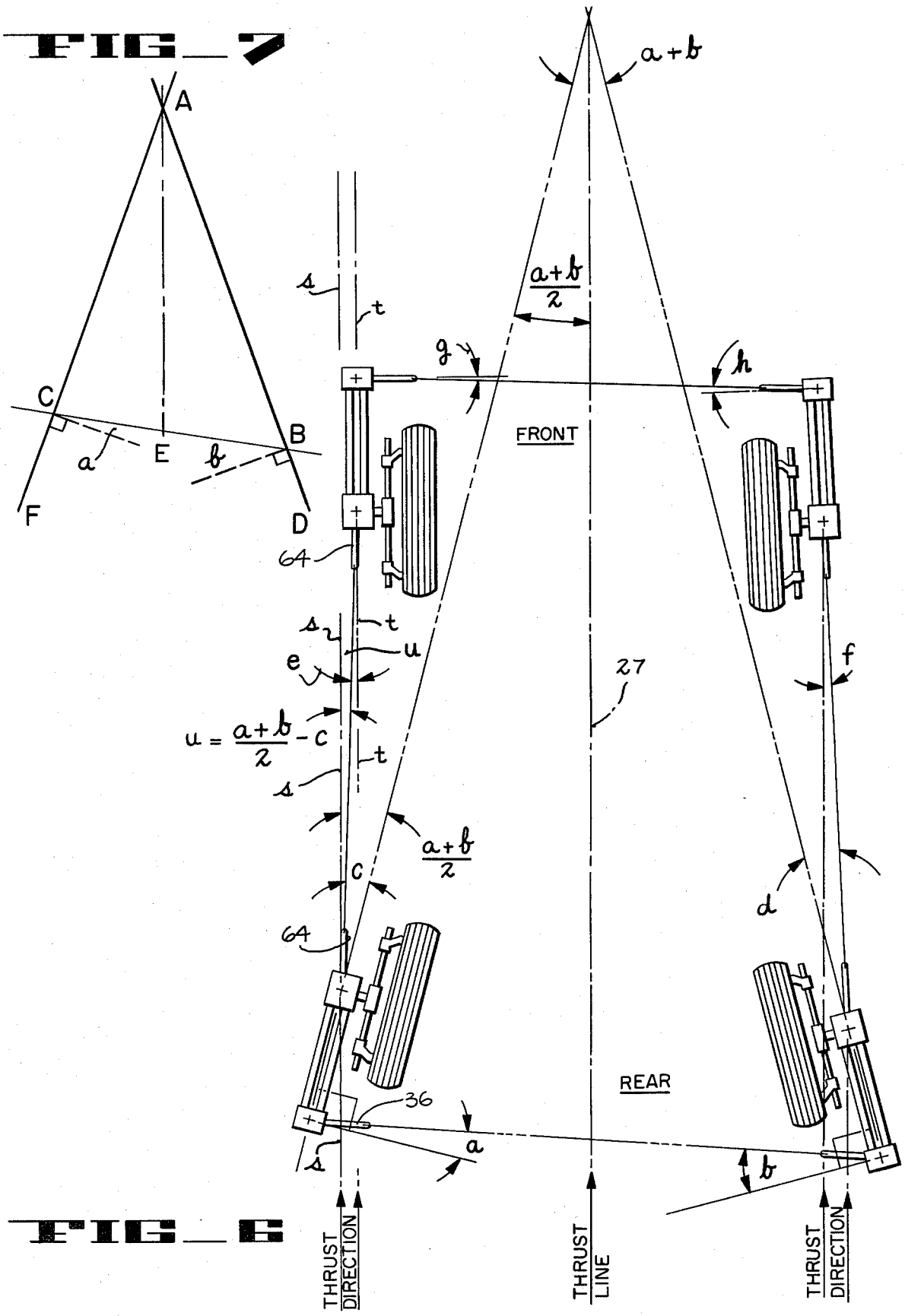

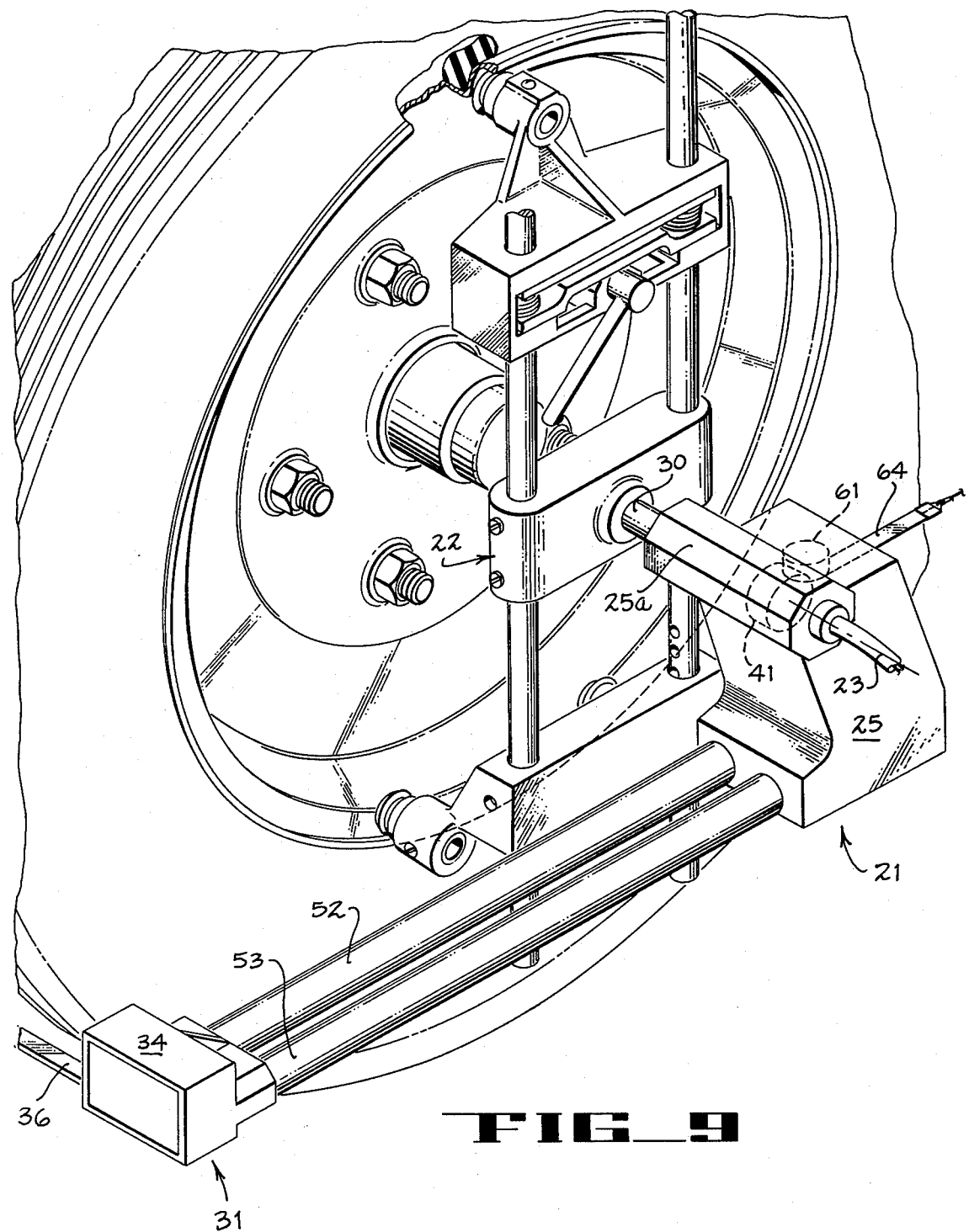
FIG_9

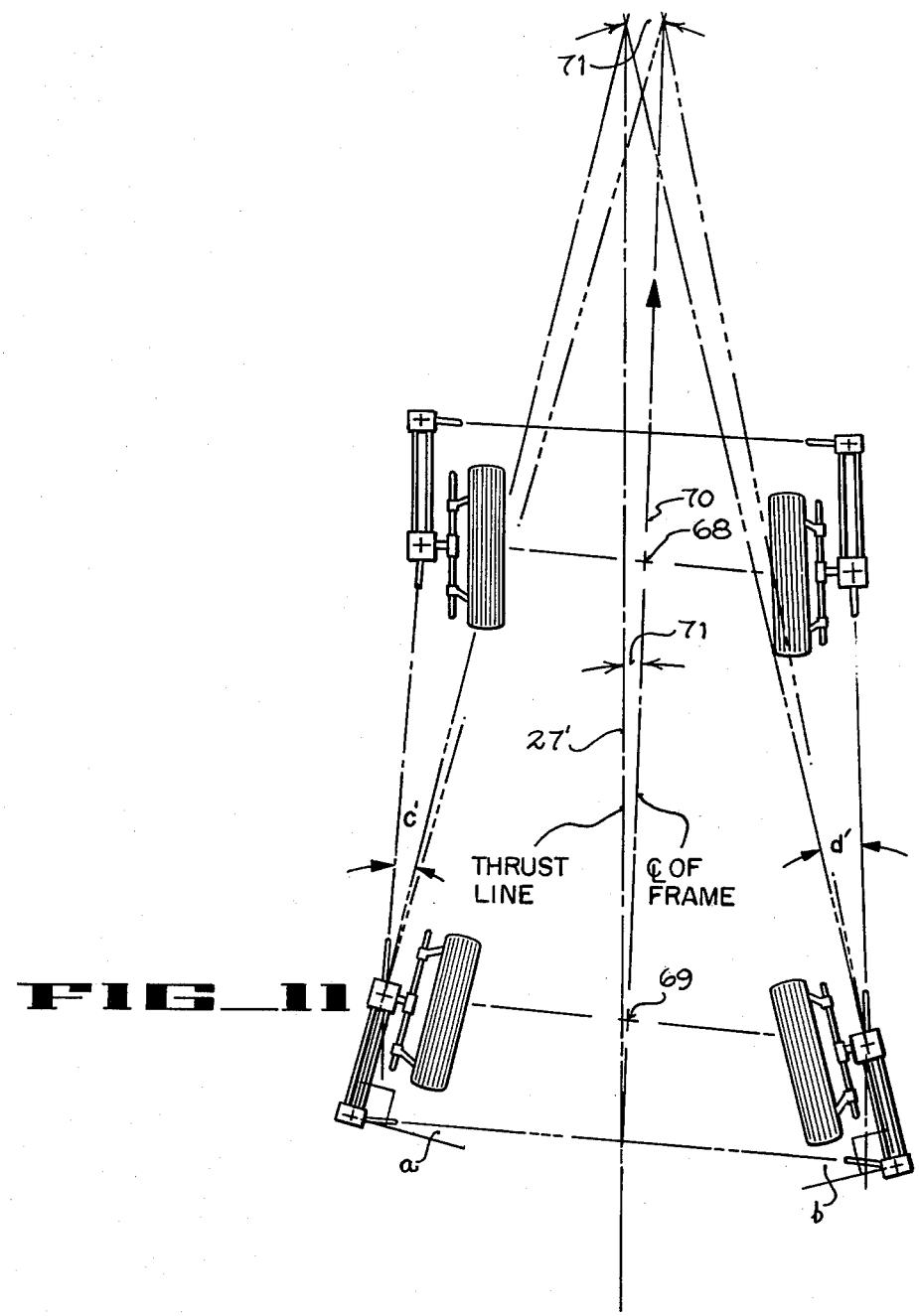
FIG_11
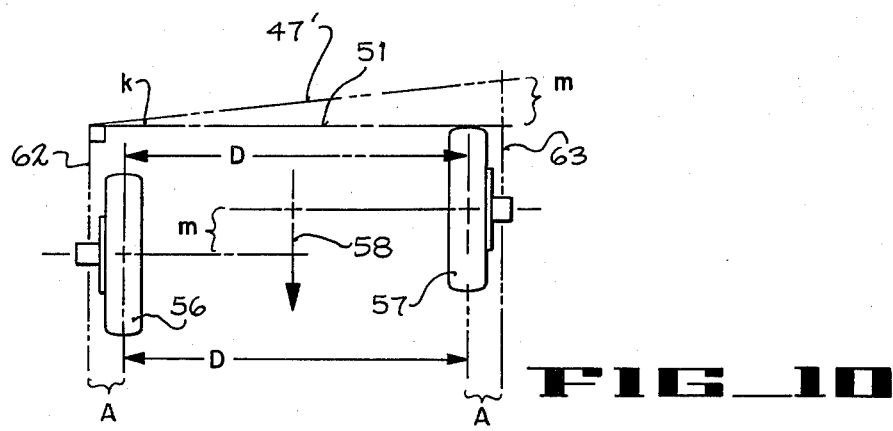
FIG_10

WHEEL ALIGNMENT SYSTEM AND METHOD

This invention pertains to an improved wheel alignment system and method particularly usable in conjunction with a vehicle of a type where all four wheels are independently alignable.

The system as described herein serves to align all four wheels of a vehicle with respect to the thrust line of the vehicle. The thrust line, as used herein, pertains to a basic reference line defining the forward direction of the wheel system when disposed to have the least resistance to such forward motion. Thus, this reference line will be the direction along which the rear wheels tend to drive the car. When the front wheels are turned to steer the vehicle away from this direction, the resistance to forward movement will increase. Determination of the thrust line is important for vehicles of a type where all four wheels must be independently alignable with respect to a common reference. This is also advantageous where the rear wheels must be adjustable so as to "track" the front wheels. Finally, by being able to align all four wheels with respect to a common direction using a thrust line, the method simplifies "squaring" of the steering wheel with respect to a straight ahead position for the vehicle.

The method and apparatus described herein further serve to define the "thrust line" of a vheicle so as to align all the wheels with respect thereto. The thrust line is needed to be determined in order to define the "toe" of all wheels independently of each other. Being able to define the thrust line also permits the front wheels to be aligned with respect to the rear wheels.

A system of the kind described further serves to define the "set back" for the wheels, i.e. between the front or rear wheels so as to indicate any damage to the frame.

Presently toe is measured with respect to the toe of the other wheel opposite the first. Thus, total toe is measured and divided by some other factor, for example the steering wheel setting, rear reference lines, etc. to achieve the toe of each of the front wheels, or by measuring the total toe of both front wheels and dividing this amount by two.

As disclosed herein the toe for each given wheel can be measured by itself since, as described herein the thrust line defined by the rear wheels of the vehicle is determined so that the front wheels can be positioned parallel to the thrust line before measuring the parameters, such as caster, camber, etc. of the front wheels. Positioning the front wheels parallel to the thrust line is important because the caster value varies rapidly as the wheels move through a position parallel to the thrust line as explained with reference to FIG. 8.

Also, locating the wheels parallel to the thrust line defines the straight ahead position for the vehicle whereby the steering wheel can be "squared" with respect to the vehicle.

A wheel alignment system of the type described further below serves to permit the steering wheel to be centered with respect to the thrust line of the vehicle as well as defining the toe and camber of the rear wheels and the set-back for the front and rear wheels.

Finally, in order to eliminate "crabwise" movement of a vehicle in a given direction it is necessary that the geometric axis of the frame correspond to the thrust line of the wheel system. Thus, a line joining the mid-points between both the front and the rear wheels serves to define the center line of the frame and, as disclosed herein the thrust line and the geometric axis of the frame can be adjusted to correspond to each other so as to eliminate "carbwise" movement of the vehicle.

In general, it is an object of the present invention to provide an improved wheel alignment system particularly useful for aligning all four wheels of a vehicle independently of each other.

More particularly, it is an object of the present invention to provide a system in which the center line of the frame and the thrust line can be made to correspond so as to eliminate displacement between the direction of movement of the wheel system and the orientation of the center line of the axis of the frame.

It is another object of the present invention to provide a system for defining the thrust line of a wheel system for aligning all four wheels of a vehicle with respect thereto.

It is yet a further object of the present invention to provide a system for defining the thrust line of a wheel system to enable the rear wheels to be adjusted to "track" the front wheels.

It is yet another object of the invention to provide a system for angularly defining "set-back" so as to indicate any damage to the frame.

It is a further object of the present invention to provide a system for measuring the "toe" of each wheel independently of the other wheels.

The foregoing and other objects of the invention will become more readily evident from the following detailed description of a preferred embodiment of the invention when considered in conjunction with the drawings.

FIG. 1 shows a diagram with portions in plan and others in perspective according to the invention;

FIG. 2 is a diagrammatic perspective view with portions broken away for clarity showing a toe sensor assembly;

FIG. 3 shows a diagrammatic perspective of a transducer mounting assembly housing and its contents;

FIG. 4 shows an enlarged diagrammatic perspective view of a detail showing the end of a sensor tongue;

FIGS. 5A, 5B, and 5C show a diagrammatic illustration for purposes of explanation with regard to defining the thrust direction or line;

FIG. 6 shows a diagram for computing various angles defined by the wheels of a vehicle;

FIG. 7 shows a diagram for purposes of explanation of FIG. 6;

FIG. 8 shows a graph representing change in caster angle with change in angular displacement of the wheels;

FIG. 9 shows an enlarged perspective view of a wheel of a vehicle carrying a transducer mounting assembly therewith; FIG. 10 shows a diagram explaining angular measurement of linear set-back between a pair of wheels; and FIG. 11 shows a diagram to explain alignment of thrust line to center line of chassis.

A wheel alignment system 10, as shown generally in FIG. 1 has been provided to accomplish the foregoing objectives as now to be described.

Wheel alignment system 10 serves to simultaneously sense the physical orientation of each of four wheels of a vehicle (as represented by the frame 11). As shown in FIG. 1 wheels 12L and 12R are intended to constitute the front wheels of the vehicle whereas wheels 13L and 13R are the rear wheels. Each of the wheels, as best shown in FIG. 9, carries a transducer support assembly 21 supported alongside each wheel by means of a mounting bracket 22. Bracket 22 is pivotally coupled to assembly 21 to permit the wheel to rotate on its axis independently of assembly 21. Thus, bearings (not shown) carried within a bearing housing portion 25a of housing 25 engage the axle extension 30 to pivotally support assembly 21.

Transducer support assembly 21 comprises a housing 25 carrying elongate tubular arms 52, 53 disposed in parallel relation. The distal end of said arms carries a transducer assembly 31.

Assembly 31 comprises a housing 34 mounted onto the ends of arms 52, 53 and includes a potentiometer 32 having an annular collar 37 secured to the wiper (not shown) of potentiometer 32. Housing 34 further includes a slot 35 through which a thin, flat, flexible tongue or lever arm 36 can be inserted to be secured to collar 37 by means of the screws 41. Slot 35 also permits tongue 36 to be moved between advanced and retracted positions through an arc bisected by an angle perpendicular to the direction of arms 52, 53.

As thus arranged movement of operating arm 36 serves to control the movement of a wiper associated with potentiometer 32 to provide electrical signals on lead 46 representative of toe movement.

Accordingly, transducer support assembly 21 as shown in FIG. 9 is slung pivotally in bearings from axle extension 30 of the vehicle being aligned. Thus assembly 21 pivots about the axis 23 of the axle of its associated wheel whereby mounting bracket 22 rotates with the wheel independently of assembly 21. Transducer support assemblies 21 at each wheel of the vehicle serve to dispose a related head assembly 31 at a position beyond the wheels to enable a cable 47F or 47R to be coupled therebetween. In this manner both front and rear wheel toe can be measured as explained below.

Each support assembly 21 carries a tubular shaped camber sensor 29 containing conductive fluid therein for operating a Wheatstone bridge device employing electrodes penetrating the sealed cylindrical body for generating information indicative of the camber of the wheel. Assembly 21 (for the front wheels) also includes a caster monitor sensor 28 of similar construction including leads 28a, b, c, extending out of sensor 28 to be connected to a Wheatstone bridge (not shown) for monitoring change in caster.

A rear wheel reference sensor device comprises the potentiometer 61 which is varied by arcuate movement of the elongate tongue or operating arm 64. Arm 64 protrudes rearwardly of the leading assemblies 21 through a slot 65. Elastic cables 48R and 48L formed at opposite ends with means to engage hooks 14 serve to couple the rearwardly directed and forwardly directed operating arms 64 of assemblies 21 on each side of the vehicle.

Thus, similar assemblies 21 as described above are carried from the rear wheels but reversed in direction.

At the rear of the vehicle, a cable 47R is coupled between a pair of operating arms 36 for operating sensors 32 in assemblies 31 disposed beyond the rear wheels. Cables 47R and 47F are each of a substantially elastic flexible material formed at each end with means for engaging hook 14 at the end of each operating arm 36.

As shown in FIG. 4 hook 14 is interconnected to arm 36 by means of an inelastic flexible tendon 15 connected to a compressed coupling element 16 secured to the end of operating arm 36.

Run-out sensors, such as potentiometers 41 can be used to indicate the rotational position of the wheel so that as camber readings are taken from camber sensor 29 at a sequence of positions a camber correction curve or table can be supplied to computer console 19.

From the foregoing it will be evident that information will be obtained from the leading sensor assemblies 21 derived from the electrical signals from potentiometer 32 operated in response to movements of operating arms 36; electrical outputs from camber sensors 29 dependent upon the camber of the wheel; caster monitoring sensors 28; and from the rear wheel sensing potentiometer 61.

Transducer support assemblies 21 for the rear wheels provide the foregoing information with the exception of the caster monitoring information since the rear wheel transducer support assemblies can be satisfactorily operated without the caster monitoring sensors.

Briefly, in operation the structure as described above performs as follows. After cables 47 have been connected at their opposite ends to hooks 14 of lever arms or tongues 36 to extend across both the front and rear of the vehicle, and cables 48R and 48L are similarly coupled to tongues 64 extending alongside the vehicle, a substantial amount of information can be derived as explained further below.

The angular displacement of lever arms 36 with respect to a position normal to arms 52, 53 can be employed to define the toe of the vehicle as explained below. The foregoing electrical information from toe potentiometer 32, camber sensor 28, and caster monitoring sensor 28 is supplied to computer console 19 via the output leads 24, 26. Similar information can be derived from the rear transducer support assemblies 21 via leads 38, 39 for connection to computer console 19.

The foregoing arrangement makes it possible to define the "thrust direction" or "thrust line" of a vehicle whereby a number of significant advantages can be achieved as now to be described.

The thrust line can be most simply described as the forward direction of the vehicle as dictated by the orientation of the rear wheels. Thus, the thrust direction (or thrust line) can be considered to be the direction along which the two rear wheels try to drive the vehicle. Put another way, it is a basic reference line defining the forward direction of the wheel system employing minimum resistance to such forward motion as caused by the wheel system.

Thus, as shown in FIGS. 5A through 5C, examples of the location of a thrust line is shown as located between a pair of rear wheels 16, 17. With reference to FIG. 5A the plane of wheel 16 is disposed at an angle x of 13° to a plane perpendicular to an axis 18 parallel to the axles of rear wheels 16, 17 when properly positioned to roll straight ahead. Similarly, with respect to wheel 17 the angle y of 15° is formed. Accordingly, if the two angles are added together and divided by two the thrust line 27 will be 14° to the right of the plane 33 normal to 18 thereby defining thrust line 27.

With respect to FIG. 5B the two rear wheels 16, 17 are shown in a position having a mutually outward toe whereby as indicated on the drawing the angle x of wheel 16 to the plane 33 can be represented as (−)10° (following the convention that angles to the left of plane 33 will be considered "negative" whereas angles to the right of the plane will be considered positive. Thus, angle x as shown equals (−)10° whereas angle y as shown is represented as (+)17°. Following the formulation noted above the thrust line 27' will be 3½° to the right of plane 33.

Finally, as a third example shown in FIG. 5C the thrust line 27" is shown as a negative 3° following the foregoing formulation and using the convention of a leftward angle being negative.

While the foregoing examples shown in FIG. 5 indicate what the thrust line is, the manner of deriving or measuring the thrust line on a vehicle using the apparatus shown in FIG. 1 will be explained further below with respect to FIG. 6.

Preliminarily, reference to FIG. 7 and FIG. 2 will be of some additional assistance before explaining FIG. 6.

While it has been stated that pivoting movement of lever arm 36, as shown in FIG. 2 serves to vary the output of its associated potentiometer 32, it is preferable, as a convention, to consider the lever arm as providing a zero reading when disposed normal to the axis of arms 52, 53. Then movement of lever arm 36 from the normal will provide positive or negative indications of angular movement.

From the diagram shown in FIG. 7 it will be evident that the toe measurements a and b are taken from potentiometer 32. Toe angles a and b serve to define the total toe of the two rear wheels and, by bisecting the total toe the thrust line can be defined.

Thus, starting with the proposition that the sum of the included angles within the triangle A,B,C, must equal 180°, and further noting the proposition that an angle and its supplement will equal 180°, it can be shown that the angle CBD must equal the sum of the included angles located at C and A.

Accordingly, this can be shown as follows:

$$CBD = BAC + BCA$$

Bisecting angle CAB with line AE:

$$DBE = BAE + BEA \text{ and } FCE = CAE + CEA$$

Accordingly, the angle $DBE + FCE = [BAE + BEA] + [CAE + CEA]$ and since $BEA + CEA = 180°$, $DBE + FCE = BAE + CAE + 180°$.

Therefore, $[DBE - 90°] + [FCE - 90°] = BAE + CAE$. Thus, by measuring the angles at "a" and "b" it is possible to directly measure the total toe of the rear wheels of the vehicle.

Accordingly, the angles "a", "b" represent the angles which will be measured by the movement of lever arms 36 from a position perpendicular to the axis of their supporting arms 52, 53.

As noted above the sum of the quantity $(a+b)$ divided by two serves to define the thrust line or thrust direction 27 as an angle defined by the thrust line on one side and the mid-plane of an unsteerable wheel on the other.

For reasons described further below with respect to FIG. 8, camber, caster, toe, etc. can be most advantageously measured and/or computed, i.e. the information regarding camber, caster, etc. is the most accurate or reliable when the front wheels are parallel to the thrust direction. Accordingly, since the angle "c" can also be measured by movement of the forwardly directed lever arm 64 of the left rear assembly 21, the following steps are taken in establishing parallelism of the front wheels with respect to the thrust direction:

Angles a, b, c are measured $a+b$ = the total toe

Line s is constructed parallel to thrust line 27 and is directed through the potentiometer operated by lever arm 64

Thus, the angle u is defined as $(a+b)/2 - c$

A line t is constructed parallel to the plane of the left front wheel and through the potentiometer 61 for arm 64. Line t serves to move with the movement of the left front wheel. For line t (and hence the left front wheel) to be parallel to thrust line 27 the angle e must equal the quantity $(a+b)/2 - c$. When the lines s and t are parallel by virtue of movement of the left front wheel, the left front wheel will be parallel to thrust line 27. At that point the information regarding camber, caster, etc. will be the most accurate or reliable.

As shown in FIG. 8, a plot of camber versus steering angle has been provided with the camber being plotted on the Y axis, the steering angle being plotted on the X axis. Thus, the camber for the front wheels when parallel to the thrust line is indicated at point R on curve 42. It can be observed that the slope of curve 42 is relatively sharp as it passes through the intersection R with the Y axis. Thus, if the wheels are not parallel with the thrust line a substantially different camber reading will be provided. However, in the system 10 described above, a highly accurate determination can be made so as to enhance the accuracy of camber readings. Accordingly, it is readily evident that the provision of means for detecting parallelism of the wheels with respect to the thrust line serves to render more accurate readings of the camber values.

Accordingly, the left front wheel will be straight ahead when the measurement of angle e (from movement of tongue 64 of the left front wheel) equals the measurement of angle u (which equals $(a+b)/2 - c$) and the right front wheel will be straight ahead when angle $f = (a+b)/2 - d$.

The angle "d" in the last formulation is measured just as c was measured previously. An additional benefit of employing a system of the kind which is shown in FIG. 1 is that the rear wheels may be aligned at the same time that the front wheels are being aligned so that the wheel system is aligned as an entire unit.

The system as above described can further provide additional information with regard to set-back of the wheels with respect to each other whereby to indicate damage to the frame or problems needing to be compensated for. Set-back can be measured as an angle between the wheels of each pair using the thrust line as a reference since it has been observed that the set-back angle in degrees will be substantially equal to the set-back between the wheels measured in inches, and can be computed precisely in inches when knowing the exact spacing between the heads.

Thus, as shown in FIG. 10, after a pair of wheels 56, 57 have each been disposed to lie in parallel planes with respect to their related thrust line 58, the set-back "m" can be determined by the formulation:

$$m = (D + 2A) \tan k.$$

where "k" represents the angle measured by the toe line or cable 47' and a line 51 normal to each of the transducer support arms 62, 63 carried respectively from wheels 56, 57.

By sensing the value of angle "k" and employing the published specification as to the spacing between the mid-planes of wheels 56, 57 (identified above by the letter D) plus the known stand-off distances, A, the computation of (D+2A) tan k provides the set-back indicated by the displacement "m".

While the foregoing explanation has referred to "front" and "rear" wheels of a four wheel vehicle this designation has implicitly pertained to conventional automobiles in which the rear wheels are unsteerable and the front wheels are steerable.

Accordingly, the principles of the present invention extend beyond such a vehicle, since it is the "unsteerable" wheels that define the thrust line whether located front or rear. Thus, the thrust line of many different types of vehicle can be determined using the foregoing techniques when applied to "unsteerable" wheels (whether front or rear) and "steerable" wheels (whether front or rear).

Accordingly, the foregoing system serves to define the thrust line of a vehicle of a type including two laterally spaced unsteerable wheels generally following the steps of establishing a position disposed in a plane parallel to and alongside each unsteerable wheel and at a common predetermined distance beyond the tire of each wheel. Next, a straight line is defined between these positions. At one of the unsteerable wheels the angle defined between the straight line and a first line normal to the plane of the same one of the unsteerable wheels is detected and the angle between the straight line and a second line normal to the plane of the other unsteerable wheel is also detected. One-half the sum of the two detected angles serves to define the angle of the plane of each unsteerable wheel with respect to the thrust line of the vehicle.

Knowledge of the thrust line is also employed when "squaring" the steering wheel by disposing the steering wheel to a position squared with respect to the interior of the vehicle and then locking the steering wheel against movement. Then, with the steering wheel locked against movement the midplane of each steerable wheel is then moved into parallel relation with resepct to the thrust line.

Finally, knowledge of the thrust line becomes involved when deriving set-back as explained above pursuant to the method comprising the steps of disposing the mid-planes of the wheels in substantially parallel spaced relation with respect to the thrust line of the vehicle, establishing a straight line between common positions beyond each tire, sensing the angle defined between said straight line and a line normal to the plane of one of the wheels, converting the degrees of said angle as detected directly to inches to correspond substantially to the set-back in inches for full size vehicles having a mid-plane displacement between the wheels of something of the order of 50 inches or more.

In addition, the set back method can include the additional step of multiplying the displacement between the mid-planes of two wheels (plus two stand-off distances, A) by the tangent of the detected angle k to compute the set-back displacement for front or rear wheels.

Thus, it should be readily evident that an improved wheel alignment system permits detecting the thrust line of the vehicle, "squaring" of the steering wheel so that it is properly positioned when driving straight ahead, the sensing of wheel movement relative to the thrust line for orientation of a steerable wheel parallel to the thrust line for taking caster and camber readings, and for providing direct read-out of set-back between laterally spaced wheels.

As diagrammed in FIG. 11, knowledge of the position of the thrust line 27' can be employed to permit the rear wheels to be adjusted so that the thrust line and geometric axis 70 of the frame of the vehicle coincide.

The geometric axis 70 of the frame is defined by a line 70 joining the mid-points 68, 69 between the front wheels and between the rear wheels respectively.

As shown in FIG. 11 the presence of an off-set angle 71 defined between thrust line 27' and the geometric axis 70 of the frame (not shown) indicates that the chassis of the vehicle is disposed at an angle to the direction of movement of the wheel system whereby the vehicle will advance "crabwise" along a highway.

By knowing the thrust line it is possible to eliminate this condition by adjusting the rear wheels until the angle c' equals the angle d' (corresponding to angles c and d as explained above with respect to FIG. 6).

In addition, the amount of displacement can be computed by multiplying the average length of the vehicle by the tangent of the difference between angles c' and d'. The "length" of the vehicle is an average of the distance taken between the ends of the front and rear axles on both the right and left sides of the chassis. Accordingly, computer means 19 serves to receive information from each of the potentiometers noted above. Therefore, with respect to measuring the angles c' and d', means including computer means 19 serves to sense the angle between the plane of an unsteered wheel and a line extending between first and second positions respectfully on the axis of rotation of associated steered and unsteered wheels. The first and second positions are displaced a common distance from the mid-plane of its associated wheel. Finally, computer means 19 serves to compare the angles c' and d' as sensed on both sides of the vehicle to determine the difference between c' and d'.

It has been observed that the offset angle 71 corresponds to the difference between angles c' and d'.

We claim:

1. In a wheel alignment system for a vehicle of a type having a laterally spaced pair of unsteered wheels and a thrust line, a system for detecting the thrust line of the vehicle comprising, in combination: a pair of transducer support assemblies, each including an elongated means, carried from one end by and disposed to extend alongside an associated one of said unstered wheels to a position at a substantially common predetermined distance beyond the unsteered wheels; means defining a first straight line between a distal end of each of said pair of said elongated means; detecting means, in each of said transducer support assemblies, for establishing a second straight line normal to a mid-plane of each of said unsteered wheels and for establishing a measured angle at each of said unsteered wheels, each of said measured angles defined between said first straight line and said second straight line; and computing means for determining said thrust line of said vehicle by computing one-half of a sum of said measured angles.

2. In a wheel alignment system according to claim 1 in which said means for sensing said angles comprises a potentiometer carried by said elongated means, means yieldingly coupling the wipers of said potentiometers for moving said wipers to define an angle with respect to its associated elongated means, the sum of the movement of the wipers associated with said unsteered wheels from a position normal to said elongated means serving to define the total toe of said unsteered wheels.

3. In a wheel alignment system for a vehicle having a steerable wheel, an unsteerable wheel, and a thrust line, a system for disposing a plane of said steerable wheel to a position parallel to the thrust line of said vehicle, said system comprising, in combination: a first transducer support assembly carried by said steerable wheel and a second transducer support assembly carried by an unsteerable wheel disposed in tandem spaced relation with respect to said steerable wheel on a same side of said vehicle, each said assembly including an elongated means carried from one end by and disposed to extend alongside an associated wheel to a position beyond the wheel, means for defining the thrust line of the vehicle, each said transducer support assembly including first sensing means for measuring angles, means defining a straight line between said first angle sensing means in each of said first and second assemblies for establishing a reference line at an angle to the thrust line, a difference between (a) a first angle defined between said elongate means of said second assembly and said thrust line of said vehicle, and (b) a second angle measured by the sensing means of said second assembly and defined by said elongate means of said second assembly and said reference line, defining a correction angle between said reference line and an imaginary line parallel to said thrust line, the angle between said imaginary line and said thrust line being taken through said angle sensing means of said second assembly; second sensing means for measuring a changing angle between (a) said elongate means of said first assembly attached to said steerable wheel and (b) said reference line; and comparing means for detecting when said moving angle is substantially equal to said correction angle whereby whenever said changing angle corresponds to said correction angle, the plane of said steerable wheel will lie parallel to the direction of the thrust line for advantageously measuring caster and camber.

4. In a wheel alignment system according to claim 3 in which said means serving to define said thrust line of the vehicle comprises a third transducer support assembly also including an elongated means carried from one end by and disposed to extend alongside a second unsteerable wheel to a position at a given distance beyond the tire carried by the second unsteerable wheel, said elongated means carried by said first unsteerable wheel extending a distance substantially equal to said given distance, said second unsteerable wheel being disposed in laterally spaced relation to said first unsteerable wheel, means defining a straight line between the distal end of each of said elongate means carried by said laterally spaced unsteerable wheels for establishing angles at each of said first and second unsteerable wheels, said angles being defined between said straight line and a line which is normal to said elongated means at each of said first and second unsteerable wheels, means for sensing said angles, one-half the sum of said angles so detected with respect to the unsteered wheels serving to define the angle of said elongated means with respect to the thrust line of the vehicle.

5. In a wheel alignment system according to claim 3 in which said means for defining the thrust line as one-half the sum of the angles defined between said elongated means with respect to the straight ahead orientation of the non-steerable wheels carrying same.

6. In a wheel alignment system for a vehicle, a system for detecting set-back between laterally spaced wheels comprising, in combination: means for aligning said wheels parallel to the thrust line of the vehicle; only two transducer support assemblies, each including an elongated means of a predetermined length and having two ends, said elongated means being carried from one end by and disposed to extend alongside an associated one of the wheels to a position at a substantially common predetermined distance beyond the wheels, each said elongated means being spaced a known distance from a mid-plane of its associated wheel; means for defining a first straight line between the distal end of each of said pair of elongated means and disposed at each wheel at an angle to a line normal to the plane of the wheel and for defining a second straight line between each of said other ends of said elongated means; sensing means for determining a set-back angle defined by said first straight line and said second straight line; and computing means for multiplying a tangent of the set-back angle by a sum of the displacement between the mid-planes of the wheels and both said known distances to determine the set-back as a distance which the axis of rotation of one wheel must be moved to become coaxial of the other.

7. The method of defining an alignment of a wheel relative to a thrust line of a vehicle of a type including two laterally spaced unsteerable wheels comprising the steps of establishing a single position disposed in a plane parallel to and alongside each said unsteerable wheel; at points that are a common, predetermined distance beyond each of said wheels, establishing a straight line between said positions; detecting angle at each of said unsteerable wheels defined between said straight line and a first line normal to the plane of one of the unsteerable wheels and between said straight line and a second line normal to the plane of the other unsteerable wheel; and computing one-half a sum of the two detected angles to define the angle of the plane of each unsteerable wheel with respect to the thrust line of the vehicle.

8. A method of detecting set-back of one wheel with respect to another laterally spaced therefrom on a vehicle comprising the steps of disposing the mid-planes of the wheels in substantially parallel spaced relation with respect to the thrust line of the vehicle, establishing a straight line between common positions beyond each tire, sensing the angle defined between said straight line and a line normal to the plane of one of the wheels, converting the degrees of said angle as detected directly to inches to correspond substantially to the set-back in inches for full size vehicles having a mid-plane displacement between the wheels of the order of 50 inches.

9. A method of detecting set-back according to claim 8 including the step of multiplying the tangent of said detected angle by the sum of said mid-plane displacement and any displacement of said common positions with respect to the mid-plane of each wheel to compute the set-back displacement.

10. In a wheel alignment system for a vehicle of a type having laterally spaced pair of unsteered wheels, a system for detecting the thrust line of the vehicle comprising, in combination: means, associated with each of said unsteered wheels, for defining a position in a plane parallel to a mid-plane of the wheel and at the same predetermined distance beyond each of said unsteered wheels and for defining a straight line extending between said positions and for defining a line normal to the mid-plane of the wheel and for sensing an angle between said straight line and said line normal to the mid-plane; and computing means for computing one-half the sum of said angles so sensed to define the angle of said mid-plane with respect to the thrust line of the vehicle.

11. A system for determining the offset angle between the thrust line of a wheel system and the geometric center line of the chassis of the vehicle carrying the wheel system comprising, in combination; on both sides of the vehicle, means for sensing the angle between the plane of an unsteered wheel and a line extending between first and second positions respectively on the axis of rotation of associated unsteered and steered wheels, first and second positions being displaced a common distance from the mid-plane of said unsteered and steered wheels on the same side of the vehicle and computing means for comparing said angles as sensed on both sides of the vehicles to determine the difference therebetween, said difference defining said offset angle.

12. A system for determining the amount of displacement comprising means for determining the difference between said angles according to claim 11 and means for multiplying the average length of the displacement between the front and rear axles of the vehicle by the tangent of said difference.

* * * * *